United States Patent [19]

Todd

[11] 3,946,066

[45] Mar. 23, 1976

[54] DIMERISATION PROCESS AND CATALYST

[75] Inventor: Peter Frank Todd, Stockton, England

[73] Assignee: Imperial Chemical Industries Limited, London, England

[22] Filed: Aug. 29, 1974

[21] Appl. No.: 501,605

[30] Foreign Application Priority Data
Oct. 1, 1973  United Kingdom............... 45686/73

[52] U.S. Cl... 260/465.8 D; 252/466 R; 260/485 R; 260/561 R
[51] Int. Cl.²......................................... C07C 120/00
[58] Field of Search..... 260/465.8 D, 485 R, 561 R, 260/561 N

[56] References Cited
UNITED STATES PATENTS 3,484,475  12/1969  Cornforth et al............ 260/465.8 D
3,655,724  4/1972  Linn et al. .................... 260/465.8 D
3,729,498  4/1973  Masada et al................ 260/465.8 D

FOREIGN PATENTS OR APPLICATIONS 1,177,059  1/1970  United Kingdom.......... 260/465.8 D
1,270,026  6/1968  Germany ..................... 260/465.8 D Primary Examiner—Joseph P. Brust
Attorney, Agent, or Firm—Cushman, Darby & Cushman

[57]  ABSTRACT

A ruthenium catalyst of improved performance for the dimerisation and hydrodimerisation of olefinically unsaturated compounds, especially acrylonitrile, is obtained by co-precipitating a ruthenium compound with an aluminium oxide and/or hydroxide.

3 Claims, No Drawings

DIMERISATION PROCESS AND CATALYST

This invention relates to catalysts suitable for the dimerisation and hydrodimerisation of olefinically unsaturated compounds, and to methods for the preparation of such catalysts and for their use in such dimerisation processes.

it has already been proposed to dimerise and hydrodimerise olefinically unsaturated compounds using ruthenium catalysts. Particulary suitable olefinically unsaturated compounds are those which are acceptors in Michael reactions, that is compounds containing a group of the general formula -C = CR-
in which the Group R is one which activates the double bond. Examples of such compounds may be found in "Organic Name Reactions" by Krauch & Kunz, 1964, John Wiley & sons at page 315, in "Name Reactions in Organic Chemistry" by A. R. Surrey, 2nd edition, 1961, Academic Press, at pages 173 to 174, and in "Name Index of Organic Reactions" by J. E. Gowan and T. S. Wheeler, 1960, Longmans at pages 169 to 172. Particularly important examples are alpha-beta-olefinically unsaturated esters, amides and nitriles, especially the acrylic esters and acrylonitrile.

It has already been proposed to dimerise and/or hydrodimerise acrylonitrile both in the liquid and the vapour phase in presence of a ruthenium catalyst which may, if desired, be supported on a conventional catalyst support, for example alumina.

According to our invention a particularly suitable catalyst for the dimerisation and hydrodimerisation of olefinically unsaturated compounds comprises ruthenium co-precipitated with an aluminium oxide and/or hydroxide.

The catalysts of our invention may be manufactured, for example, by co-precipitating a ruthenium compound and an aluminium oxide or hydroxide from a solvent containing a soluble ruthenium compound and a soluble aluminium compound giving rise to the oxide or hydroxide.

A particularly suitable solvent is water. However, mixtures of water with water-miscible organic solvents, for example alkanols, especially methanol, ethanol and the propanols, may be used in suitable cases. As water soluble ruthenium compounds there may be used the salts of ruthenium, for example the halides (e.g. chloride and bromide), and the sulphate and nitrate as well as salts of organic acids, especially of the aliphatic acids, for example the acetate or lactate. Ruthenates, for example ammonium pentachlororuthenate, may also be used.

Water-soluble compounds of aluminium from the aqueous solutions of which the oxide or hydroxide may be precipitated are well-known and generally include the salts, for example the halides (e.g. chloride and bromide), and sulphate, and the salts of organic acids, especially of the aliphatic acids, for example the acetate or lactate. Mixtures of aluminium oxide and hydroxide may be used, and also mixtures with other compounds. Such mixtures may be used to modify the effect of the catalyst. For example the oxide or hydroxide of aluminum may be mixed with other compounds, for example those of tin, copper, bismuth, nickel, palladium or cadmium. Thus, in dimerisation of acrylonitrile the inclusion of a proportion of bismuth when preparing a catalyst by co-precipitating ruthenium with alumina, gives a highehr proportion of hydrodimer (adiponitrile) to dimer (1,4-dicyanobutenes). Such compounds may be co-precipitated as the oxide or hydroxide together with the ruthenium compound and the aluminium oxide or hydroxide, for example by adding a water-soluble salt of the said element to the aqueous solution of the ruthenium salt and aluminium salt prior to adding the precipitating agent.

Co-precipitation of a ruthenium compound and the aluminium oxide or hydroxide may usually be achieved by adding a base to an aqueous solution of the soluble ruthenium compound and the soluble aluminium compound giving rise to the oxide or hydroxide. In order to achieve co-precipitation and to avoid precipitation of the aluminium before the ruthenium we prefer to avoid the use of strong alkalis such as the alkali metal hydroxides, e.g. sodium and potassium hydroxide. Ammonium hydroxide may be used. We prefer to use, however, organic amines and, more especially, aliphatic, cycloaliphatic or araliphatic primary, secondary or tertiary amines, for example ethylamine, diethylamine, triethylamine, cyclohexylamine and phenylethylamine. Urea may also be used as a precipitating agent. Physical examination of the co-precipitated catalysts of our invention obtained with our preferred precipitating agents shows that they consist essentially of ruthenium oxy-hydroxy species intimately mixed with pseduo-boohmite (i.e. $AlO.OHxH_2O$) (see X-Ray Identification and Crystal Structure of Clay Minerals, edited G. Brown, The Mineralogical Society, London, 1961, page 362). The morphology of these catalysts remains unchanged during use, although heating at temperatures in excess of about 200°C should be avoided since the catalyst then undergoes dehydration and phase transistion to a less active form.

The proportion of ruthenium to aluminium in the co-precipitated catalyst is not critical. Normally it will fall with the ratio of 1 : 40 to 10 : 1 by weight. It may be desirable for the catalyst to be supported on a suitable support, for example pumice, kieselguhr, carbon, alumina or silica, and this may be effected, for example, by co-precipitating the catalyst on the support.

After co-precipitation of the catalyst it may be separated from the solvent, for example by filtration or by centrifuging, and, if desired, it may be washed free from soluble matter, for example of water soluble salts, and, if desired, dried. Drying is preferably effected at temperatures not in excess of 110°C.

The catalyst of our invention may be used for the dimerisation or hydrodimerisation of olefinically unsaturated compounds and especially of acrylonitrile in either the liquid or the vapour phase. When used in the liquid phase, it is an advantage of the catalyst of our invention that it has very low solubility in the reaction medium and may readily be separated from it, for example by filtration or centrifuging, without significant loss of the costly ruthenium. Moreover, the catalyst remains effective and may be re-used.

It is desirable for dimerisation to be effected in presence of hydrogen since this not only increases the total proportion of dimer plus hydrodimer formed, but also increases the relative proportion of hydrodimer to dimer. Instead of gaseous hydrogen itself a hydrogen donor, that is a compound which under the conditions of the reaction is capable of supplying hydrogen, may be used, for example a metal hydride such as calcium hydride, sodium borohydride or lithium aluminium hydride, a metal alkyl such as aluminium triethyl and zinc dibutyl, and hydrogen transfer agents such as isopropanol and cyclohexene.

Although the temperature of the dimerisation or hydrodimerisation reaction may vary widely, when using our catalysts we prefer to operate in the range from 50° to 200°C, more preferably 100° to 150°C in order to preserve the catalyst activity and to reduce production of undesired organic by-products. The reaction may be carried out under pressure, and when conducting the reaction in presence of gaseous hydrogen, or when using volatile reactants in the liquid phase, pressure will normally be employed, for example pressures up to 250 atmospheres. If desired, a solvent may be used, for example acetonitrile, propionitrile or other solvents which are inert under the reaction conditions, for example hydrocarbon solvents such as benzene, toluene and cyclohexane, chlorinated hydrocarbons such as chlorobenzene, and oxygen-containing organic compounds such as alcohols (e.g. methanol, ethanol and the propanols), ethylene glycol monomethyl or monoethyl ether and dioxan.

The product dimer and/or hydrodimer may be separated from the product mixture by conventional means, for example by distillation, preferably after first separating the catalyst. Separation of dimer from hydrodimer may be effected at the same time, or it may be unnecessary to effect such separation since the mixture may be acceptable for the intended use.

In the case of acrylonitrile the product is normally a mixture of isomeric 1,4-dicyanobutenes and adiponitrile. Such a mixture may be hydrogenated to give entirely adiponitrile, for example by using a noble metal catalyst, such as a platinum catalyst. The resulting adiponitrile may be hydrogenated to hexamethylene diamine, for example by using an iron, cobalt or nickel catalyst. Hexaemthylene diamine is an important intermediate for the manufacture of polyamides, for example of polyhexamethylene adiponitrile (or nylon 6,6) by polycondensation with adipic acid.

It is an advantage of the catalyst of our invention that a very high conversion can be achieved when it is used in the dimerisation of acrylonitrile in the liquid phase whilst remaining insoluble in the reaction medium, although the degree of conversion will depend on the time of contact with the catalyst. Moreover a high proportion of dimer and hydrodimer (1,4-dicyanobutene and adiponitrile) is obtained compared with unwanted byproduct propionitrile. A co-precipitated catalyst of ruthenium and alumina is considerably more effective in this respect than a catalyst in which ruthenium is supported on alumina.

The invention is illustrated but not limited by the following Examples in which the parts and percentages are by weight.

EXAMPLE 1

10 parts of aluminium chloride hexahydrate and 1 part of ruthenium chloride hydrate were dissolved in 100 parts of distilled water and with rapid stirring at room temperature and then treated with triethlyamine (approximately 30 parts) until precipitation was completed and the mixture had attained a pH value of 9. After stirring a further 30 minutes the gelatinous brown precipitate was filtered from the colourless aqueous supernatant liquor and washed with water until free of Cl⁻. The precipitate was dried at 100°C for several hours to give 4 to 5 parts of a brown brittle solid which was crushed and sieved to pass a 60 mesh (BSS) sieve.

Analysis of the catalyst gave the following result, 7.9% w/w Ru, 23% w/w Al.

EXAMPLE 2

In a similar way, 10 parts of aluminium chloride hexahydrate and 1 part of commercial ruthenium chloride hydrate were dissolved in 100 parts of deionised water, a solution of 0.5 parts of bismuth nitrate pentahydrate in 5 parts of 6N nitric acid was added and with rapid stirring at 20°C the mixture was made alkaline (to pH 9) with about 40 parts of triethylamine. A thick gelatinous brown precipitate was then thrown down. After stirring a further 15 mins. the precipitate was removed by filtration and washed with water. The catalyst was dried by heating in an oven at 110°C for 12 hours and finely ground.

EXAMPLE 3

1 part of catalyst as prepared in Example 1 was treated with 10 parts of freshly distilled acrylonitrile and then heated under 400 p.s.i. hydrogen at 120°C for 15 hours. A pressure drop of 300 p.s.i. was recorded. Analysis by G.L.C. of the pale yellow and brown reaction mixture after separation from the insoluble catalyst (1 part) showed that a conversion of acrylonitile of 99.8% had been achieved and the product distribution consisted of:

| | |
|---|---|
| cis-1,4-dicyanobutene-1 | : 21.3% |
| trans-1,4-dicyanobutene-1 | : 20.4% |
| adiponitrile | : 18.3% |
| cis/trans-1,4-dicyano-butene-2 | : 0.8% |

A total dimer product of 60.8% with 39% of by-product propionitrile.

EXAMPLE 4

1 part of the catalyst prepared as in Example 2 was heated with 10 parts of acrylonitrile under 400 p.s.i. hydrogen in a small stirred autoclave at 120°C for 15 hours. G.L.C. analysis of the resultant liquid product after removal of the insoluble catalyst was as follows:

| | |
|---|---|
| adiponitrile | : 42.6% |
| cis-1,4-dicyanobutene-1 | : 9.20 |
| trans-1,4-dicyanobutene-1 | : 9.80 |
| cis/trans-1,4-dicyanobutene-2 | : 0.90 |
| propionitrile | : 36.9 |

With an overall conversion of acrylonitrile of 99.4%. After the catalyst of Example 2 had been sintered by heating at 250°C it gave under similar conditions to those above a conversion of acrylonitrile of 35.6%, the product containing 28.6% of total linear dimers and 71.4% of propionitrile.

EXAMPLE 5

This Example illustrates the discontinuous recycling of catalyst. 1 part of a catalyst prepared as in Example 2 containing 1.4 wt.% of Ru was mixed with 10 parts of distilled acrylonitrile and then heated under 400 p.s.i. hydrogen at 120°C for 6 hours. A pressure drop of 200 p.s.i. was noted. The residual pressure was released and the bomb contents were filtered, the separated catalyst was recharged with a further 10 parts of acrylonitrile and reheated at 120°C under 400 p.s.i. hydrogen for a further 6 hours. After let down the solid catalyst was again separated and re-reacted with more fresh acrylonitrile. These operations were repeated for a total of five cycles. At the end of these experiments the total products were analysed by GLC.

The following table shows the product spectrum obtained at each cycle (wt.%) based on the acrylonitrile converted (average 80.3%) conversion.

| CYCLE | 1 | 2 | 3 | 4 | 5 |
|---|---|---|---|---|---|
| % ADN | 48.1 | 23.7 | 6.3 | 5.7 | 8.9 |
| % cis-1,4-dicyanobutene-1 | 1.3 | 13.7 | 20.2 | 26.4 | 22.4 |
| % trans-1,4-dicyanobutene-1 | 1.2 | 14.3 | 25.2 | 23.9 | 26.0 |
| cis and trans-1,4-dicyanobutene-2 | | Total over 5 cycles:5% | | | |
| % propionitrile | 49.4 | 48.3 | 48.2 | 44.0 | 43.0 |

Fractional distillation of the product gave 16 parts of total linear dimers boiling between 120° – 140°C/1 mm. Hg. pressure. The weight of catalyst recovered was 0.9 part with no allowance made for mechanical losses.

EXAMPLE 6

Comparative Example

This Example illustrates the relative inferiority of catalysts prepared by the conventional deposition of ruthenium compounds on to an alumina support for this reaction. 100 parts of gamma-alumina cylinders (approximately 5 mm. long × 1½ mm. diameter) were shaken with a solution of 500 parts of acrylonitrile containing 5 parts of commercial ruthenium chloride hydrate. Triethylamine was added with continuous agitation until precipitation had ceased. The acrylonitrile and excess triethylamine were removed by evaporation under reduced pressure and the catalyst finally dried under reduced pressure at 110°C and obtained as black pellets. 2 parts of the catalyst so obtained were charged to an autoclave with 10 parts of acrylonitrile and heated with agitation to 120°C under 400 p.s.i. hydrogen for 8 hours.

GLC analysis of the resultant liquid product after decantation from the catalyst particles was:

| | |
|---|---|
| cis-1,4-dicyanobutene-1 | : 20.7% |
| trans-1,4-dicyanobutene-1 | : 21.3 |
| 1,4-dicyanotubene-2 | : 1.2 |
| adiponitrile | : 3.5 |

A total useful dimer yield of 46.7%, at a conversion of acrylonitrile of 63.1%. Propionitrile accounted for 53.3% of total product.

EXAMPLE 7

Comparative Example

This Example illustrates the dimerisation reaction as carried out homogeneously with ruthenium chloride hydrate in presence of triethylamine. 0.2 part of commercial ruthenium chloride hydrate, 0.4 part of triethylamine and 20 parts of acrylonitrile were charged to a stirred autoclave and heated at 120°C under an initial pressure of 400 p.s.i. hydrogen for 20 hours. A conversion of 90% of the acrylonitrile was observed. GLC analysis of the yellow-brown liquid product containing soluble ruthenium compounds was as follows:

| | |
|---|---|
| cis-1,4-dicyanobutene-1 | : 25.5% |
| trans-1,4-dicyanobutene-1 | : 26.6 |
| adiponitrile | : 5.3 |
| propionitrile | : 42.6 |

EXAMPLE 8

A catalyst was prepared as in Example 1, but using hydrated aluminium trinitrate in place of aluminium chloride. 1 part of the resultant powdered catalyst with 10 parts of freshly distilled acrylonitrile were heated under 400 p.s.i. hydrogen at 120°C for 6 hours. Analysis by GLC of the resultant reaction mixture after separation of the insoluble brown catalyst showed a conversion of acrylonitrile of 24% and a product distribution consisting of:

| | |
|---|---|
| cis-1,4-dicyanobutene-1 | : 20.7% |
| trans-1,4-dicyanobutene-1 | : 32.4% |
| adiponitrile | : 8.2% |
| propionitrile | : 38.7% |

EXAMPLE 9

A catalyst was prepared as in Example 2, but using aqueous ammonium hydroxide (Sp. Gr. 0.88) as the precipitating base instead of triethylamine. The resulting brown-black precipitate after drying at 100°C for 12 hours was powdered and used as a catalyst for the hydrodimerisation of acrylonitrile. After 6 hours reaction in an autoclave at 400 p.s.i. hydrogen and 120°C, 84.4% of the acrylonitrile had been converted to a product spectrum consisting of:

| | |
|---|---|
| cis-1,4-dicyanobutene-1 | : 34.7% |
| trans-1,4-dicyanobutene-1 | : 21.5% |
| adiponitrile | : 9.2% |

A total useful dimer product of 67.4% with 32.6% of byproduct prioponitrile.

EXAMPLE 10

A catalyst prepared as in Example 1, but using trimethylamine (25% v/v in water) as the precipitating organic base gave a greenish-black catalyst after drying. This catalyst when used for the hydrodimerisation of acrylonitrile as in Example 8 yielded a product consisting of:

| | |
|---|---|
| cis-1,4-dicyanobutene-1 | : 32.4% |
| trans-1,4-dicyanobutene-1 | : 31.6% |
| adiponitrile | : 7.1% |
| propionitrile | : 29.5% | at a 33% conversion of the acrylonitrile.

EXAMPLE 11

A catalyst prepared as in Example 1 using urea as precipitating agent gave on reaction with acrylonitrile under the hydrodimerisation conditions of Example 8 a product spectrum by GLC analysis containing:

| | |
|---|---|
| cis-1,4-dicyanobutene-1 | : 26.8% |
| trans-1,4-dicyanobutene-1 | : 26.0% |

| | |
|---|---|
| adiponitrile | : 6.3% | the remainder (40.9%) being propionitrile at a conversion of acrylonitrile of 70%.

EXAMPLE 12

A catalyst prepared as in Example 1 starting from ammonium pentachlororuthenate $(NH_4)_2RuCl_5H_2O$; instead of commercial ruthenium trichloride gave a catalyst of comparable activity, yielding on reaction with acrylonitrile 55% total dimers at 73% overall conversion of acrylonitrile.

EXAMPLE 13

A catalyst prepared as in Example 2, but using cadmium chloride in place of bismuth nitrate as a synergistic reagent gave on reaction with acrylonitrile under the hydrodimerisation conditions of Example 8 a product consisting of 64% total linear dimers, of which 16% was adiponitrile at an acrylonitrile conversion of 45%.

I claim:

1. A process for the conversion of acrylonitrile to a product containing more than 50% by weight of adiponitrile, 1,4-dicyano-butenes, or mixtures thereof, which comprises heating acrylonitrile in the liquid phase at a temperature of 50° to 200°C and a pressure of up to 250 atmospheres in the presence of hydrogen or a compound capable of supplying hydrogen under reaction conditions and a catalyst consisting essentially of a ruthenium compound co-precipitated with an aluminum oxide or hydroxide in which the proportion of ruthenium to aluminum is in the range 1:40 to 10:1 by weight, said catalyst being obtained by adding a base less strong than alkali metal hydroxide to an aqueous solution to form an alkaline solution containing a water-soluble ruthenium compound and a water-soluble aluminum compound to effect co-precipitation and separating the co-precipitate at a temperature below about 200°C.

2. The process according to claim 1 wherein the catalyst is an intimate admixture of a ruthenium oxyhydroxy species and pseudo-bohmite.

3. The process according to claim 1 wherein the said base is selected from the group consisting of ammonium hydroxide, an organic amine or urea.

* * * * *